United States Patent
Kim

(10) Patent No.: US 7,432,462 B2
(45) Date of Patent: Oct. 7, 2008

(54) STEERING WHEEL OF A VEHICLE

(75) Inventor: Jae Young Kim, Busan (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/648,726

(22) Filed: Dec. 29, 2006

(65) Prior Publication Data

US 2008/0128249 A1    Jun. 5, 2008

(30) Foreign Application Priority Data

Nov. 30, 2006    (KR) .................. 10-2006-0120022

(51) Int. Cl.
*H01H 35/00* (2006.01)
(52) U.S. Cl. ..................... 200/61; 200/61.54
(58) Field of Classification Search .............. 200/61

See application file for complete search history.

(56) References Cited

U.S. PATENT DOCUMENTS

| | | | | |
|---|---|---|---|---|
| 4,518,836 A | * | 5/1985 | Wooldridge | 200/61.54 |
| 4,697,092 A | * | 9/1987 | Roggendorf et al. | 307/10.1 |
| 6,525,283 B2 | * | 2/2003 | Leng | 200/339 |
| 7,026,561 B2 | * | 4/2006 | Min | 200/61.54 |

* cited by examiner

*Primary Examiner*—Elvin Enad
*Assistant Examiner*—Lheiren Mae A Anglo
(74) *Attorney, Agent, or Firm*—Morgan Lewis & Bockius LLP

(57) ABSTRACT

A steering wheel provided with a remote control switch. The remote control switch includes a user-settable unit and a variable circuit unit for changing a function of the remote control switch according to the configuration of the user-settable unit; for example, the function of the remote control switch may be changed by attaching a removable button with the desired function.

12 Claims, 2 Drawing Sheets

STEERING WHEEL OF A VEHICLE

CROSS-REFERENCE TO RELATED APPLICATION

This application claims priority to and the benefit of Korean Patent Application No. 10-2006-0120022 filed in the Korean Intellectual Property Office on Nov. 30, 2006, the entire contents of which are incorporated herein by reference.

BACKGROUND OF THE INVENTION (a) Field of the Invention

The present invention relates to a steering wheel provided with a remote control.

(b) Description of the Related Art

Recently, steering wheels have been provided with remote controls. Since the configuration of buttons on such a steering wheel is predetermined by the manufacturer, locations of the buttons may not correspond to a driver's preference or usage frequency.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a steering wheel having a remote control with a user-settable unit configuration.

An exemplary embodiment of the present invention provides a steering wheel of a vehicle that includes at least one remote control switch. The remote control switch includes a user-settable unit and a variable circuit unit for changing a function of the switch according to the configuration of the user-settable unit.

The user-settable unit may be inserted into and extracted from one of a plurality of housings disposed at predetermined positions of the steering wheel, and may have a cylindrical or prism shape. The user-settable unit may include: a display portion for displaying a function at the upper surface thereof; a guide protrusion for guiding the insertion/extraction of the user-settable unit into/from a housing at a side surface thereof; and a plurality of contact pins at a bottom surface thereof. The number and configuration of contacts pins varies according to the function of each user-settable unit.

Each housing may be provided with a guide groove corresponding to the guide protrusion portion, and the housing may be provided with a printed circuit substrate having a plurality of contact holes on a bottom surface thereof. The contact pins of the user-settable unit are respectively electrically connected to each corresponding contact hole when the user-settable unit is inserted into the housing.

One contact pin and one contact hole corresponding to the one contact pin may form one switch, and combinations of other contact pins and other contact holes respectively corresponding to the other contact pins may form a plurality of other switches. The user-settable unit may be cylindrical, and each housing may have a cylindrical cavity portion for accommodating the cylindrical user-settable unit. Each housing may be provided with a cover plate having an opening portion corresponding to the cavity portion. The user-settable unit may have sufficient thickness to be easily inserted to and extracted from the cavity portion.

When the knob is pressed and a corresponding switch is closed, one signal may be input through the switch and transmitted to the other switches electrically connected thereto such that a function of the switch is performed.

DETAILED DESCRIPTION OF THE PREFERRED EMBODIMENTS

A steering wheel according to an exemplary embodiment of the present invention is described in detail with reference to the figures.

A steering wheel 10 is provided with a remote control switch 20 having a plurality of user-settable units 21, preferably at a position where a driver's hands come directly in contact therewith. The user-settable units 21 may be covered with a cover, which may be made of a stretchable material for user comfort. The user-settable units 21 may indicate various control instructions, such as audio on/off or air conditioner on/off. In order to indicate the control instructions, the user-settable units 21 may be provided with a control instruction-printed display portion thereon.

Figure 1:
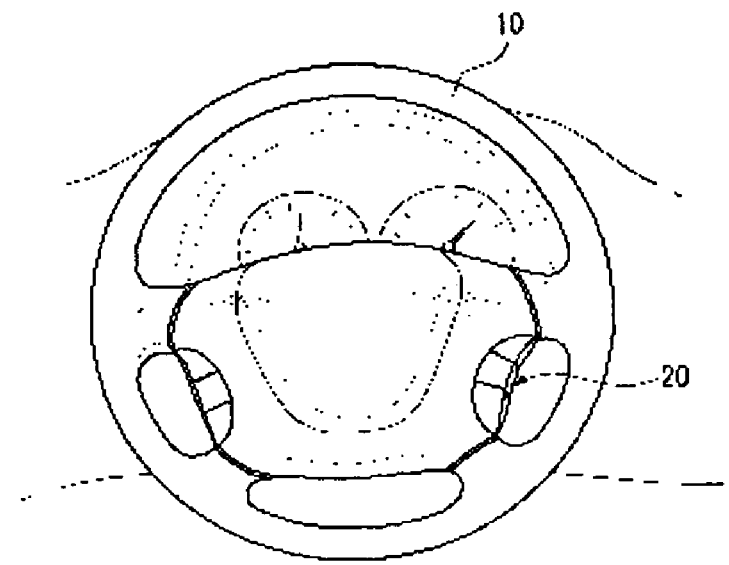
FIG. 1 is a front view of a steering wheel according to an exemplary embodiment of the present invention.
Figure 2:
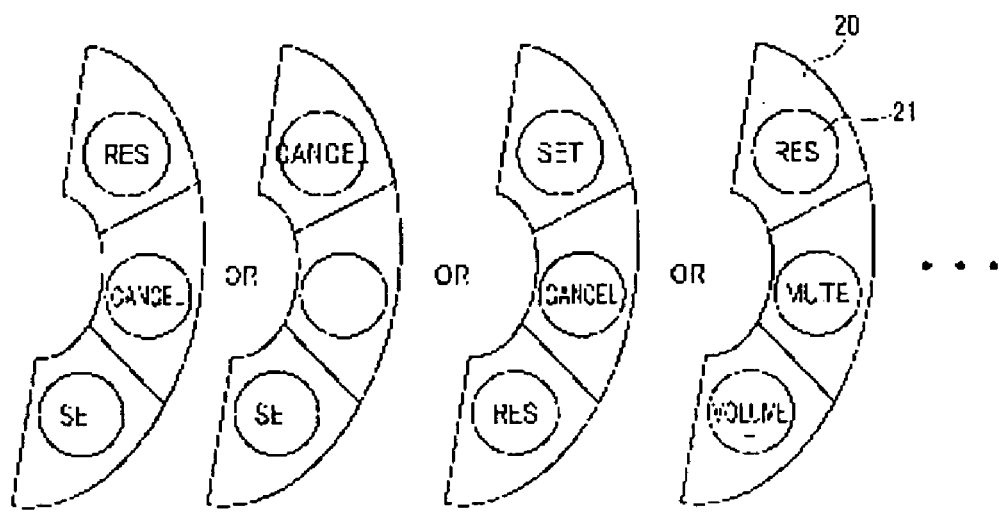
FIG. 2 is a schematic diagram of a remote control switch of a steering wheel capable of changing a switch button arrangement according to an exemplary embodiment of the present invention.

For example, as shown in FIG. 1 and FIG. 2, a the user-settable units 21 may include a display portion RES for indicating shut down/circulation of outdoor air, a display portion CANCEL for indicating on/off of TV, radio, or lighting, and a display portion SET for indicating on/off of a rear-monitoring camera. The user-settable units 21 may be replaced with different user-settable units. These user-settable units 21 are provided with a control instruction-printed display portion for indicating each control instruction.

Figure 3:
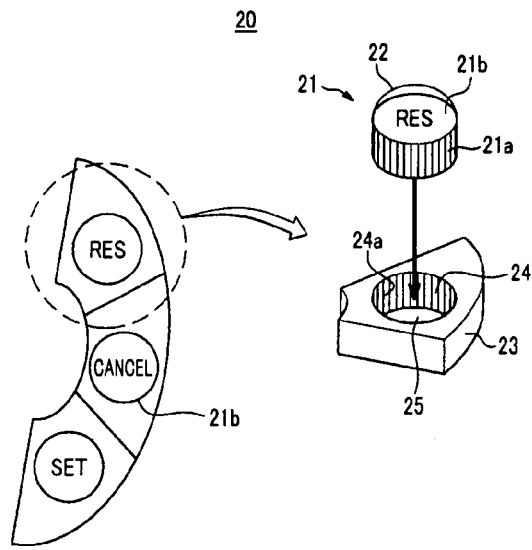
FIG. 3 is an exploded perspective view of a remote control switch of a steering wheel according to an exemplary embodiment of the present invention.

As shown in FIG. 3, the user-settable units 21 may be cylindrical, and may be respectively accommodated into housings 23, each provided at a fixed position on the steering wheel 10. While three housings 23 are illustrated for simplicity, the present invention is not limited to any number of housings 23. Each housing 23 may have a cavity portion 24 corresponding to the shape of the user-settable unit 21 such that it may accommodate the user-settable unit 21. For example, setting unit 21 and cavity portion 24 may both be cylindrical. The housing 23 may further be provided with a removable cover plate 22 whose shape corresponds to the cavity portion 24. The housing 23 may further be provided with a printed circuit substrate 25 at the bottom portion thereof.

The user-settable unit 21 may be provided with a knob thereon having a height above cavity portion 24 for easily grasping to insert and extract the user-settable unit 21. The knob may include a spring, disposed in the user-settable unit 21, for biasing the knob outward.

The user-settable unit 21 may be provided with a guide protrusion portion 21a at a side surface thereof such that it is connected with a guide groove 24a formed at a side surface of the cavity portion 24, and accordingly, the user-settable unit 21 is easily accommodated into the cavity portion 24 of the housing 23.

How to change a function of the remote control switch 20 will now be described in detail with reference to FIG. 4 and FIG. 5.

Figure 4:
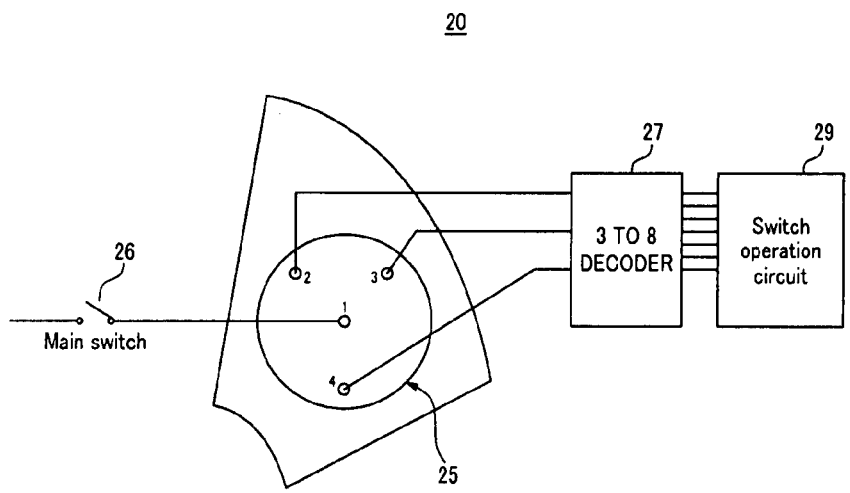
FIG. 4 illustrates a variable circuit unit of a remote control switch of a steering wheel according to an exemplary embodiment of the present invention.

As shown in FIG. 4, in an exemplary embodiment, the printed circuit substrate 25 has four contact holes 1, 2, 3, and 4 arranged thereon; however, the present invention is not limited to any particular number of contact holes. These contact holes 1, 2, 3, and 4 are all electrically connected, and the first contact hole 1 is connected to a main switch 26. The second to fourth conductive contact holes 2, 3, and 4 are connected to a decoder 27 and a switch operation circuit 29.

Figure 5:
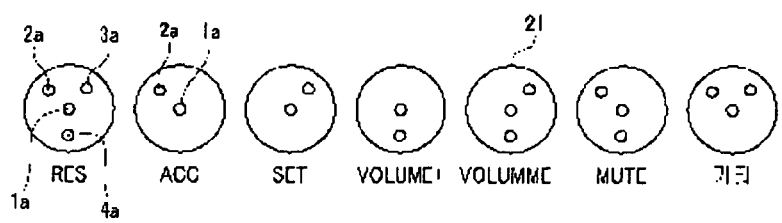
FIG. 5 is a schematic diagram showing a relation of a switch function and a contact pin arrangement of a user-settable unit of a remote control switch of a steering wheel according to an exemplary embodiment of the present invention.

Referring to FIG. 5, the user-settable unit 21 is provided with a plurality of contact pins 1a, 2a, 3a, and 4a electrically connected at the lower surface thereof such that they may set each function as a switch. The contact pins 1a, 2a, 3a, and 4a are disposed in correspondence with the positions of the contact holes 1, 2, 3, and 4. When the user-settable unit 21 is accommodated into the cavity portion 24 of the housing 23, the contact pins 1a, 2a, 3a, and 4a are respectively inserted into the contact holes 1, 2, 3, and 4, and accordingly, they are electrically connected to the contact holes 1, 2, 3, and 4. The variable electrical connections formed by the pins 1a-4a and respective ones of the holes 1-4 define a variable circuit unit 20.

Accordingly, when the main switch 26 is closed, an electrical signal is input through the first contact hole 1, and passes through the contact pin 1a of the user-settable unit 21, via at least one contact pin 2a, 3a, and 4a selectively formed on the user-settable unit 21 and the corresponding second, third, and/or fourth contact hole 2, 3, and 4 to the decoder 27. The decoder 27 decodes a switch function indicated by the electrical signal and transmits the decoded signal to the switch operation circuit 29 such that the switch operation circuit 29 performs the corresponding function.

That is, as seen in FIG. 5, any number of contact pins 1a, 2a, 3a, and 4a, up to the number of contact holes 1, 2, 3, and 4, may be selectively provided according to a function expressed on the display portion of each user-settable unit 21.

According to an exemplary embodiment of the present invention, the remote control switch 20 may output an electrical signal corresponding to the predetermined value through the decoder 27 when the user-settable unit 21 having the combined contact pins is inserted into the desired housing 23 and the main switch 26 is closed.

When the main switch 26 is closed, the input signal passes through the decoder 27 according to the arrangement of the contact pins 1a, 2a, 3a, and 4a of the user-settable unit 21. Accordingly, the signal input when the knob is pressed may be converted into a signal having eight paths formed by the combination of the second, third, and fourth pins. Accordingly, the switch function may be set according to the presence of each contact pin 1a, 2a, 3a, and 4a of the user-settable unit 21.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A steering wheel of a vehicle with at least one remote control switch, wherein the remote control switch comprises:
    a user-settable unit comprising one or more contact pins;
    a variable circuit unit for changing a function of the remote control switch according to the configuration of the user-settable unit; and
    one or more housings attached to the steering wheel, wherein the user-settable unit is configured to be inserted into and extracted from any one of the housings, wherein the housings each comprise a plurality of contact holes configured for insertion and electrical connection of the contact pins when the user-settable unit is inserted into the housing;
    wherein, when the user-settable unit is pressed, a switch comprising one of the contact pins and one of the contact holes is closed, and a first signal is input to the switch and transmitted to other switches electrically connected thereto such that a function of the user-settable unit is performed.

2. The steering wheel of a vehicle of claim 1, wherein the user-settable unit comprises a cylindrical or prism shape.

3. The steering wheel of a vehicle of claim 1, wherein the user-settable unit comprises a guide protrusion portion for guiding insertion/extraction of the user-settable unit into/from one of the housings; and
    wherein the housings each comprise a guide groove in correspondence with the guide protrusion portion.

4. The steering wheel of a vehicle of claim 1, wherein the user-settable unit comprises a display portion for indicating a function of the user-settable unit.

5. The steering wheel of a vehicle of claim 1, further comprising one or more cover plates configured to be removably inserted in the housings.

6. The steering wheel of a vehicle of claim 1, further comprising:
    a decoder for receiving a second signal through the other switches when the switch of the user-settable unit is electrically connected to a main switch and the main switch is closed; and
    a switch operation circuit for performing the function of the user-settable unit when the switch operation unit receives a third signal from the decoder.

7. A remote control switch, comprising:
    a user-settable unit comprising one or more contact pins;
    a variable circuit unit for changing a function of the remote control switch according to the configuration of the user-settable unit; and
    one or more housings attached to a steering wheel, wherein the user-settable unit is configured to be inserted into and extracted from any one of the housings, wherein the housings each comprise a plurality of contact holes configured for insertion and electrical connection of the contact pins when the user-settable unit is inserted into the housing;
    wherein, when the user-settable unit is pressed, a switch comprising one of the contact pins and one of the contact holes is closed, and a first signal is input to the switch and transmitted to other switches electrically connected thereto such that a function of the user-settable unit is performed.

8. The remote control switch of claim 7, wherein the user-settable unit comprises a cylindrical or prism shape.

9. The remote control switch of claim 7,
wherein the user-settable unit comprises a guide protrusion portion for guiding insertion/extraction of the user-settable unit into/from one of the housings; and
wherein the housings each comprise a guide groove in correspondence with the guide protrusion portion.

10. The remote control switch of claim 7, wherein the user-settable unit comprises a display portion for indicating a function of the user-settable unit.

11. The remote control switch of claim 7, further comprising one or more cover plates configured to be removably inserted in the housings.

12. The remote control switch of claim 7, further comprising:
a decoder for receiving a second signal through the other switches when the switch of the user-settable unit is electrically connected to a main switch and the main switch is closed; and
a switch operation circuit for performing the function of the user-settable unit when the switch operation unit receives a third signal from the decoder.

* * * * *